US007117669B2

(12) United States Patent
Kaboord et al.

(10) Patent No.: US 7,117,669 B2
(45) Date of Patent: Oct. 10, 2006

(54) TEMPERATURE SWING ADSORPTION AND SELECTIVE CATALYTIC REDUCTION NOX REMOVAL SYSTEM

(75) Inventors: Wayne Scott Kaboord, Mequon, WI (US); Dawn Marie Becher, Random Lake, WI (US); Fred Joseph Begale, Oconomowoc, WI (US); Daniel Woodrow Fellers, Milwaukee, WI (US); John Albert Kovacich, Waukesha, WI (US); Steven M. Kuznicki, Edmonton (CA)

(73) Assignee: Eaton Corporation, Cleveland, OH (US)

( * ) Notice: Subject to any disclaimer, the term of this patent is extended or adjusted under 35 U.S.C. 154(b) by 120 days.

(21) Appl. No.: 10/839,397

(22) Filed: May 5, 2004

(65) Prior Publication Data

US 2005/0247049 A1    Nov. 10, 2005

(51) Int. Cl.
*F01N 3/00*    (2006.01)
(52) U.S. Cl. ............... 60/288; 60/274; 60/286; 60/298; 60/300; 60/301
(58) Field of Classification Search ........... 60/274, 60/286, 287, 288, 295, 300, 301, 298
See application file for complete search history.

(56) References Cited

U.S. PATENT DOCUMENTS

| 5,125,231 | A |   | 6/1992  | Patil et al.          |
|-----------|---|---|---------|-----------------------|
| 5,388,406 | A |   | 2/1995  | Takeshima et al.      |
| 5,457,958 | A | * | 10/1995 | Boegner et al. 60/279 |
| 5,587,137 | A |   | 12/1996 | Swaroop et al.        |
| 5,727,385 | A | * | 3/1998  | Hepburn ........ 60/297|
| 5,910,097 | A |   | 6/1999  | Boegner et al.        |
| 6,113,870 | A |   | 9/2000  | Haslbeck et al.       |
| 6,119,452 | A |   | 9/2000  | Kinugasa et al.       |
| 6,170,259 | B1| * | 1/2001  | Boegner et al. 60/286 |
| 6,176,079 | B1|   | 1/2001  | Konrad et al.         |
| 6,274,106 | B1|   | 8/2001  | Held                  |
| 6,334,986 | B1|   | 1/2002  | Gieshoff et al.       |
| 6,338,244 | B1|   | 1/2002  | Guenther et al.       |
| 6,354,079 | B1|   | 3/2002  | Choi et al.           |
| 6,422,007 | B1| * | 7/2002  | Hartick ........ 60/298|
| 6,560,958 | B1|   | 5/2003  | Bromberg et al.       |
| 6,713,030 | B1|   | 3/2004  | Chandler et al.       |
| 6,735,940 | B1|   | 5/2004  | Stroia et al.         |
| 6,779,339 | B1| * | 8/2004  | Laroo et al. ... 60/297|

(Continued)

FOREIGN PATENT DOCUMENTS

EP    0 540 280 A1    5/1993

(Continued)

*Primary Examiner*—Thomas Denion
*Assistant Examiner*—Diem Tran
(74) *Attorney, Agent, or Firm*—Paul V. Keller, LLC

(57) ABSTRACT

The invention relates to systems for removing NOx from exhaust. In one aspect of the invention, after adsorption, an NOx adsorber is isolated from the main exhaust flow and desorption induced by raising the temperature. The desorbed NOx is combined with a reductant and reduced over a catalyst. Preferably, the reductant is syn gas produced in an on-board reformer. The catalyst need never be exposed to the main exhaust flow, which is particularly advantageous for catalysts sensitive to water, oxygen, or sulfur. In another aspect of the invention, a recirculating flow is induced through an NOx adsorber during a regeneration cycle. Recirculation can induce greater desorption at a given temperature, provide a source of heat for the adsorber, and allow a higher conversion rate with a fixed amount of catalyst. A further aspect of the invention relates to a vehicle-mounted adsorbers with provisions for heating.

18 Claims, 7 Drawing Sheets

U.S. PATENT DOCUMENTS

| | | |
|---|---|---|
| 6,832,473 B1 * | 12/2004 | Kupe et al. .................... 60/286 |
| 6,868,668 B1 * | 3/2005 | Suzuki ........................ 60/286 |
| 2002/0081254 A1 | 6/2002 | Boger |
| 2002/0194835 A1 | 12/2002 | Bromberg et al. |
| 2003/0074888 A1 | 4/2003 | Jobson et al. |
| 2003/0074893 A1 | 4/2003 | Webb et al. |
| 2003/0177763 A1 | 9/2003 | Twigg et al. |
| 2003/0226350 A1 | 12/2003 | Liu |
| 2004/0018132 A1 | 1/2004 | Bartley et al. |
| 2004/0040287 A1 | 3/2004 | Beu et al. |
| 2004/0050037 A1 | 3/2004 | Betta et al. |
| 2004/0052693 A1 | 3/2004 | Crane, Jr. et al. |
| 2004/0076565 A1 | 4/2004 | Gandhi et al. |
| 2004/0076566 A1 | 4/2004 | Unger et al. |

FOREIGN PATENT DOCUMENTS

| | | |
|---|---|---|
| EP | 0 702 134 A2 | 9/1995 |
| EP | 1 027 919 A2 | 8/2000 |
| EP | 1 281 842 A2 | 2/2003 |
| JP | 55-5785 * | 1/1980 |
| WO | WO 0151178 * | 7/2005 |

* cited by examiner

TEMPERATURE SWING ADSORPTION AND SELECTIVE CATALYTIC REDUCTION NOX REMOVAL SYSTEM

FIELD OF THE INVENTION

The present invention relates to the field of pollution control devices for internal combustion engines.

BACKGROUND OF THE INVENTION $NO_x$ emissions from vehicles with internal combustion engines are an environmental problem reognized worldwide. Several countries, including the United States, have long had regulations pending that will limit $NO_x$ emissions from vehicles. Manufacturers and researchers have put considerable effort toward meeting those regulations. In conventional gasoline powered vehicles that use stoichiometric fuel-air mixtures, three-way catalysts have been shown to control $NO_x$ emissions. In diesel powered vehicles and vehicles with lean-burn gasoline engines, however, the exhaust is too oxygen-rich for three-way catalysts to be effective.

Several solutions have been posed for controlling NOx emissions from diesel powered vehicles and lean-burn gasoline engines. One set of approaches focuses on the engine. Techniques such as exhaust gas recirculation, homogenizing fuel-air mixtures, and inducing sparkless ignition can reduce NOx emissions. These techniques alone, however, will not eliminate NOx emissions. Another set of approaches remove NOx from the vehicle exhaust. These include the use of lean-burn $NO_x$ catalysts, $NO_x$ adsorber-catalysts, and selective catalytic reduction (SCR).

Lean-burn NOx catalysts promote the reduction of $NO_x$ under oxygen-rich conditions. Reduction of NOx in an oxidizing atmosphere is difficult. It has proved challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiency with lean-burn catalysts is unacceptably low.

NOx adsorber-catalysts alternately adsorb NOx and catalytically reduce it. The adsorber can be taken offline during regeneration and a reducing atmosphere provided. The adsorbant is generally an alkaline earth oxide adsorbant, such as $BaCO_3$ and the catalyst can be a precious metal, such as Ru. A drawback of this system is that the precious metal catalysts and the adsorbant may be poisoned by sulfur.

SCR involves using ammonia as the reductant. The NOx can be temporarily stored in an adsorbant or ammonia can be fed continuousy into the exhaust. SCR can achieve NOx reductions in excess of 90%, however, there is concern over the lack of infrastructure for distributing ammonia or a suitable precursor. SCR also raises concerns relating to the possible release of ammonia into the environment.

U.S. Pat. No. 6,560,958 describes an adsorber-catalyst system in which hydrogen-rich synthesis gas (syn gas), including $H_2$ and CO, is used as a reductant to regenerate the adsorber. The syn gas is produced from diesel fuel in a plasma converter. Periodically, the adsorber is taken offline from the exhaust system and supplied with the syn gas. The adsorber contains a catalyst for SCR of $NO_2$ with syn gas.

U.S. Pat. No. 5,587,137 describes an exhaust system with a zeolite adsorber and a catalyst placed in line. The system is intended for a stoichimetrically fed engine. The adsorber is meant to be active during cold start. After the adsorber and catalyst heat up desorption is induced by making the exhaust stream rich in oxygen. Desorbed products are asserted to undergo conversion over the downstream catalyst in spite of the oxygen-rich conditions. A preferred adsorbant is a Y, Beta, or ZSM-5 zeolite with an $SiO_2$ to $Al_2O_3$ mole ratio of about 3 to about 20, ion exchanged with a rare earth metal, chromium, or a combination thereof.

There continues to be a long felt need for reliable, affordable, and effective systems for removing NOx from the exhaust of diesel and lean-burn gasoline engines.

SUMMARY OF THE INVENTION

The following presents a simplified summary in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later.

One aspect of the invention relates to a system and method for removing NOx from a vehicle exhaust. The exhaust is first passed over an NOx adsorber. The NOx adsorber is then isolated from the main exhaust flow. While the adsorber is isolated, desorption is induced, preferably by raising the temperature of the adsorber. The desorbed NOx is combined with a reductant and reduced over a catalyst. Preferably, the reductant is syn gas produced by an on-board reformer. According to the invention, the catalyst need never be exposed to the main exhaust flow, which is particularly advantageous for catalysts sensitive to water, oxygen, or sulfur. One catalyst bed can be shared by several adsorbers. The adsorber and the catalyst bed can be independently optimized for their respective functions. To the extent that poisoning of the adsorber is unavoidable, the adsorber can be a simpler and more cheaply replaced unit than a combined adsorber-catalyst.

Another aspect of the invention also relates to a system and method of treating vehicle exhaust with a NOx adsorber. During a regeneration phase, a recirculating flow is induced through the adsorber. A reductant is injected into the flow and reduction of NOx occurs either in the adsorber or in a separate catalyst bed. A fan can be used to drive the flow. Recirculation can serve one of several purposes. One purpose would be to induce greater desorption from the adsorber at a given temperature. Another purpose would be to heat the adsorber using the recirculating flow. A further purpose would be to achieve a higher conversion rate for NOx with a fixed amount of catalyst.

A further aspect of the invention relates to an NOx adsorber for a vehicle exhaust system. According to this aspect of the invention, the NOx adsorber is provided with a heating system, which can be an electrical resistance heater or a fluid heat exchanger. The $NO_x$ adsorber facilitates the use of temperature swing adsorption in treating vehicle exhaust.

To the accomplishment of the foregoing and related ends, the following description and associated drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
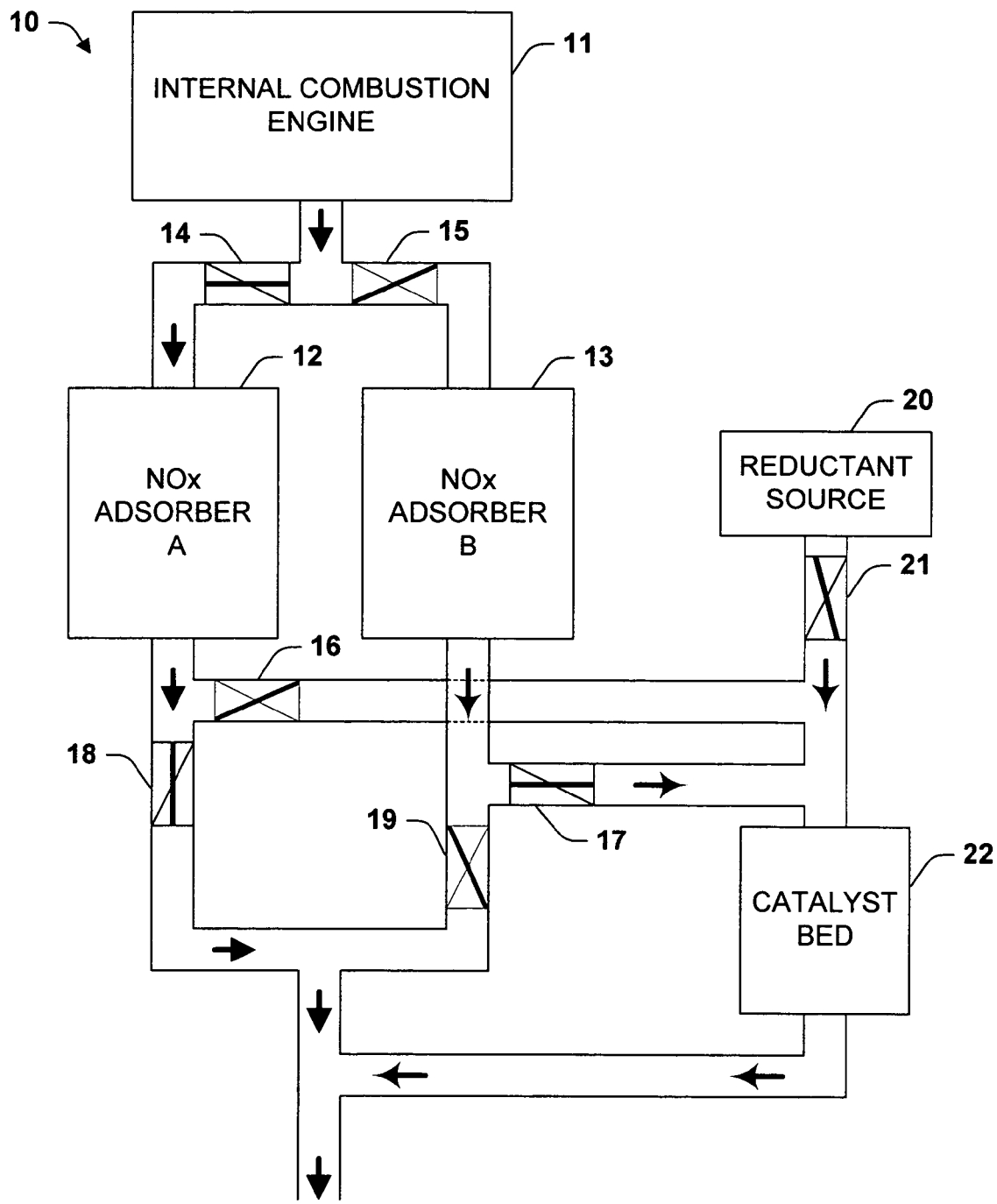
FIG. 1 is schematic illustration of a vehicle in accordance with one aspect of the present invention.

FIG. 1 is a schematic illustration of an exemplary vehicle 10 according to one aspect of the present invention. The vehicle 10 includes an internal combustion engine 11, NOx adsorbers 12 and 13, a reductant source 20, and a catalyst bed 22. The internal combustion engine 11 provides a motive force for the vehicle 10 and produces an exhaust containing NOx. The adsorbers 12 and 13 absorb NOx from the exhaust. While one of the adsorbers is treating the main exhaust flow, the other adsorber can be isolated from the main exhaust flow and regenerated. Regeneration involves inducing desorption of NOx and combining the desorbed NOx with a reductant supplied by reductant source 20. The reductant and NOx react over the catalyst bed 22 to reduce NOx to $N_2$.

The various flows are managed with valve and conduits. Valves 14 and 15, in cooperation with valves 18 and 19, selectively direct the main exhaust flow to one or the other of the adsorbers. In FIG. 1, the valve 15 is closed while the valve 14 is open, whereby the main exhaust flow is through the adsorber 12. Valves 16 and 17 selectively place one or the adsorber in communication with the catalyst bed 22. In FIG. 1, valve 16 is close while valve 17 is open, whereby gas desorbed from the adsorber 13 is channeled to the catalyst bed 22. Valve 21 controls the flow of reductant from the reductant source 20.

The invention is specifically applicable to vehicles and other mobile applications. Mobile applications create restriction on weight, dimensions, and durability. For example, an adsorber or a catalyst bed for a mobile application must be reasonably resistant to degradation under the vibrations encountered during vehicle motion. The vehicle 10 is typically powered by a fossil fuel such as diesel, gasoline, natural gas, or propane. The invention is applicable to any vehicle that burns fuel and generates an exhaust comprising NOx.

The adsorbers 12 and 13 comprise an adsorbant for NOx and are physically structured to facilitate mass transfer between the main exhaust flow and the adsorbant while limiting back-pressure on the internal combustion engine 11. $NO_x$ includes, without limitation, NO, $NO_2$, $N_2O$, and $N_2O_2$. From time to time, one or another of these specific compounds may be used as a point of reference for the sake of specificity. Adsorption is the preferential partitioning of a substance from the gas phase to the surface of a solid. Adsorption can be chemical or physical.

The adsorbant preferably has a large capacity for adsorbing NOx at typical adsorption temperatures and exhaust NOx partial pressures. Preferably, the adsorbant can adsorb at least about 3% of an NOx species by weight adsorbant at a typical adsorption temperature and 1 torr partial pressure of the NOx species, more preferably at least about 5% by weight adsorbant, and still more preferably at least about 7% by weight adsorbant. The weight of adsorbant does not include the weight of any binders or inert substrates.

The weight of adsorbant can be significant. To minimize total weight, the adsorbant preferably accounts for at least 40% of the adsorber weight, more preferably at least about 60%, and still more preferably at least about 80%. Preferably, the adsorbers as a group can adsorb at least 250 gm of an NOx species at a typical adsorption temperature and 1 torr partial pressure of the NOx species, more preferably at least about 500 gm, still more preferably at least about 1000 gm.

The vehicle 10 has two adsorbers, however, three or more adsorbers can be used. To the extent that smaller adsorbers can be cycled more quickly, the use of larger numbers of smaller adsorbers can reduce the total amount of adsorbant required. At any given time, more than one adsorber can be treating the main exhaust flow. Also, more than one adsorber can be undergoing regeneration. A system could also be designed with only one adsorber, but the main exhaust flow would go untreated during the regeneration cycle.

A typical adsorption temperature depends on the embodiment of the present invention. In one embodiment, the adsorbers 12 and 13 are cooled with engine coolant and the typical adsorption temperature is 65° C. In another embodiment, the adsorbers 12 and 13 are cooled with engine coolant or ambient air, but the exhaust is kept above the condensation temperature of water. In such a case, the typical adsorption temperature is 120° C. In a further embodiment, the adsorbers 12 and 13 are cooled to about an average exhaust gas temperature, and a typical adsorption temperature is 350° C. Lower temperature operating regimes have the advantage that a greater degree of NOx desorption can be achieved with a smaller change in the adsorbant temperature.

The heat (energy) of adsorption is a critical factor in determining the temperature increase that will induce desorption. Solid adsorbants generally have a plurality of types of binding sites with a range of heats of adsorption, but an average or approximate value can be determined by analyzing changes in partial pressure with temperature. A larger heat of adsorption means a more rapid increase in partial pressure of adsorbants with temperature. Preferably, the heat of adsorption for NO on the adsorbant is at least about 50 kJ/mol, more preferably at least about 70 kJ/mol, still more preferably at least about 90 kJ/mol.

Any suitable adsorbant material can be used. Examples of adsorbants are molecular sieves, such as zeolites, alumina, silica, and activated carbon. Further examples are oxides, carbonates, and hydroxides of alkaline earth metals such as Mg, Ca, Sr, and Be or alkali metals such as K or Ce. Still further examples include metal phosphates, such as phosphates of titanium and zirconium.

Molecular seives are materials having a crystalline structure that defines internal cavities and interconnecting pores of regular size. Zeolites are the most common example. Zeolites have crystalline structures generally based on atoms tetrahedrally bonded to each other with oxygen bridges. The atoms are most commonly aluminum and silicon (giving aluminosilicates), but P, Ga, Ge, B, Be, and other atoms can also make up the tetrahedral framework. The properties of a zeolite may be modified by ion exchange, for example with a rare earth metal or chromium. While the selection of an adsorbant depends on such factors as the desired adsorption temperature and the desorption method, preferred zeolites generally include rare earth zeolites and Thomsonite. Rare earth zeolites are zeolites that have been extensively (i.e., at least about 50%) or fully ion exchanged with a rare earth metal, such as lanthanum.

Desorption from the adsorbers 12 and 13 is preferably induced by raising the temperature of the adsorbant bed, however, other methods, such as pressure swing adsorption, and combinations of methods can be used. Depending on the adsorbant, another material such as a hydrocarbon, an oxygenated hydrocarbon, $H_2$, or CO may induce desorption. Where the reductant induces adsorption, it may be desirable to connect the reductant source 20 to the catalyst bed 22 via the adsorbers 12 and 13, whereby the reductant passes through one or more of the adsorbers 12 and 13 in reaching the catalyst bed 22.

An adsorbant material that adsorbs NOx in an oxidizing atmosphere and desorbs NOx in a reducing atmosphere can be an alkaline metal or an alkaline earth metal oxide loaded with a precious metal. An alkali metal and copper-doped hydrous zirconium oxide can also exhibit this property. Producing a reducing atmosphere can involve exposing the adsorbant to a reductant such as a hydrocarbon, an oxygenated hydrocarbon, $H_2$, or CO.

The adsorbant is typically combined with a binder and either formed into a self-supporting structure or applied as a coating over an inert substrate. A binder can be, for example, a clay, a silicate, or a cement. Portland cement can be used to bind molecular sieve crystals. Generally, the adsorbant is most effective when a minimum of binder is used. Preferably, the adsorbant bed contains from about 3 to about 20% binder, more preferably from about 3 to about 12%, most preferably from about 3 to about 8%.

The adsorbers 12 and 13 can have any suitable structure. Suitable structures can include monoliths, layered structures having two-dimensional passages, as between sheets or screens, and packed beds. Monolith passages can have any suitable cross section, including, for example, round, hexagonal, or triangular passages. Sheets or screens can be layer in any suitable fashion including, for example, stacking, rolling, or arraying about a central axis. Packed beds can be formed with pellets of the adsorbant, preferably held together with a binder or sintered to form a cohesive mass.

Optionally, the adsorbers 12 and 13 can be provided with a suitable mechanism for heating or cooling. For example, the adsorbers can be permeated with heat-exchange passages in fluid isolation from the passages provided for exhaust flow. A hot or cold fluid is circulated through the heat-exchange passages to heat or cool the adsorber. A cooling fluid could be, for example, engine coolant or ambient air. A heating fluid could be, for example, hot exhaust or a fluid that draws heat from hot exhaust or a heat-producing device such as an ammonia synthesis reactor, a catalytic reformer, or an adsorber.

In one embodiment the adsorbers each have a small number of heat-exchange passages, for example less than five, and preferably just one. A single channel can pass through the center of each adsorber. A central channel is typically rather large, having for example a cross-sectional area of at least about 1 square inch. The channels can be provided with heat exchanger fins. Advantages of heat exchange through a single central passage include simplicity and low pressure drop. The design takes advantage of the fact that larger variations in temperature are generally permissible in adsorption beds according to the invention than in catalyst beds.

The adsorber 12 and 13 can include a provision for electrical heating. Where the adsorber includes a metal substrate, the metal substrate can be used as an electrical resistance heater. As discussed more fully below, the adsorbers 12 and 13 can be heated and/or cool by circulating hot or cold gases through the same passages through which the vehicle exhaust flows. If the adsorbers 12 and 13 are provided with an oxidation catalyst, they can be heated by supplying them with fuel and oxygen. An oxidation catalyst may also be useful in the adsorbers 12 and 13 to convert NO to $NO_2$ for purposes discussed below. The adsorbers 12 and 13 can be provided with temperature sensors to control heating and/or cooling.

Adsorbants with narrow pores, especially molecular sieves, work better with certain adsorber structures. Generally, when considering a design such as a monolith for an exhaust application, smaller passages are considered desirable because they provide better contact between the gas stream and a coating on the walls. Small passages are also desirable for NOx adsorbers, up to the point where pressure drop becomes problematic, however, even with very narrow passages the utilization of a molecular sieve adsorbant may be poor. The gases may not effectively diffuse through the narrow pores of the molecular sieve into the depths of the walls and only the outer surface of the walls may be effective for adsorption.

Figure 2:
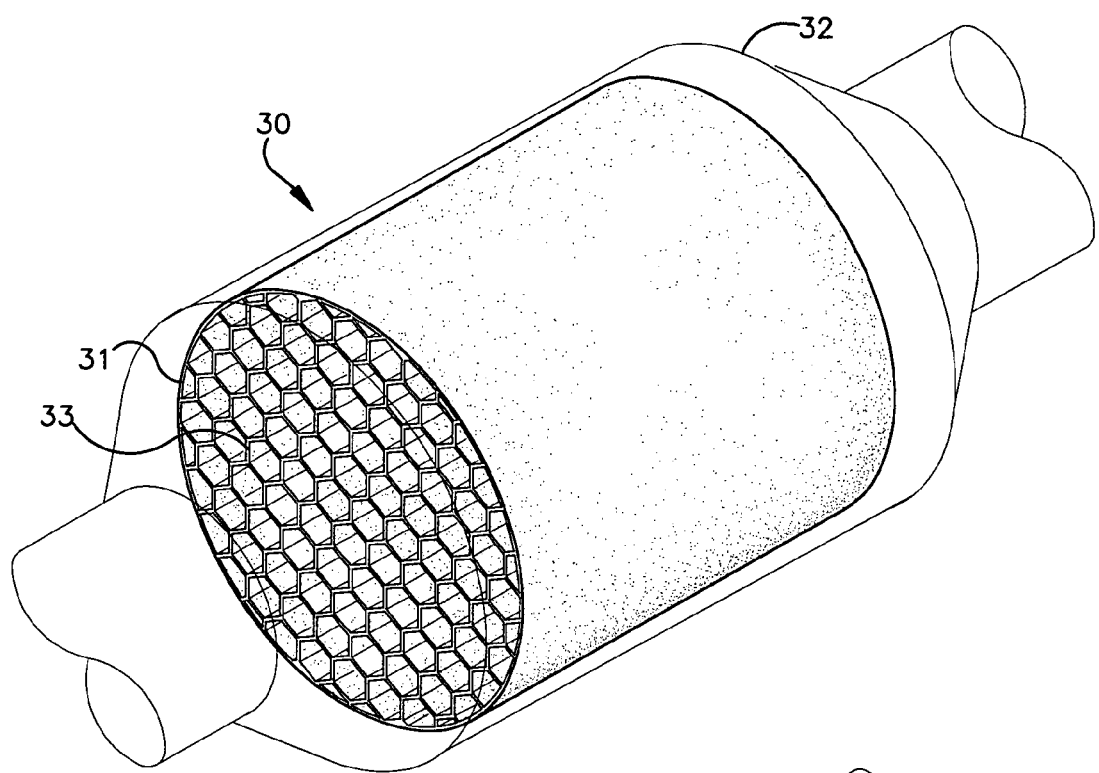
FIG. 2 is an illustration of an adsorber comprising a porous-walled monolith.

FIG. 2 illustrates an adsorber 30 with a design for improving the utilization of a molecular sieve adsorbant. The substrate 30 comprises a monolith 31 within a housing 32. The monolith 31 is preferably a self-supporting structure without an inert substrate. The monolith can be cast or extruded. Casting may be accomplished by pressing a coarse mixture into a mold followed by curing or filling the mold with small pellets and sintering them into a cohesive mass. Extrusion can be carried out in a similar fashion with heat applied at the point of extrusion to cure the binder or sinter the pellets. The walls 33 of the substrate 30 have a macroporous structure, whereby the diffusion path length from the macro-pores to the centers of the pellets is substantially less than the diffusion path length from the channels to the centers of the walls. Because the monolith 31 lacks an inert substrate, it comprises a large fraction of adsorbant by weight. Preferably, the walls of the monolith, exclusive of the channel volume and exclusive of any pores having an effective diameter less than 100 nm (an effective diameter being defined with reference to mercury porosimetry) have a void volume fraction of at least about 0.2, more preferably at least about 0.3, still more preferably at least about 0.4.

Preferably, an adsorbant bed comprises at least about 50% adsorbant by weight, more preferably at least about 70%, still more preferably at least about 90%. For the adsorber 30, the adsorbant bed is the monolith. The weight of an adsorbant bed includes any inert substrate and any binders, but does not include any housing.

Figure 3:
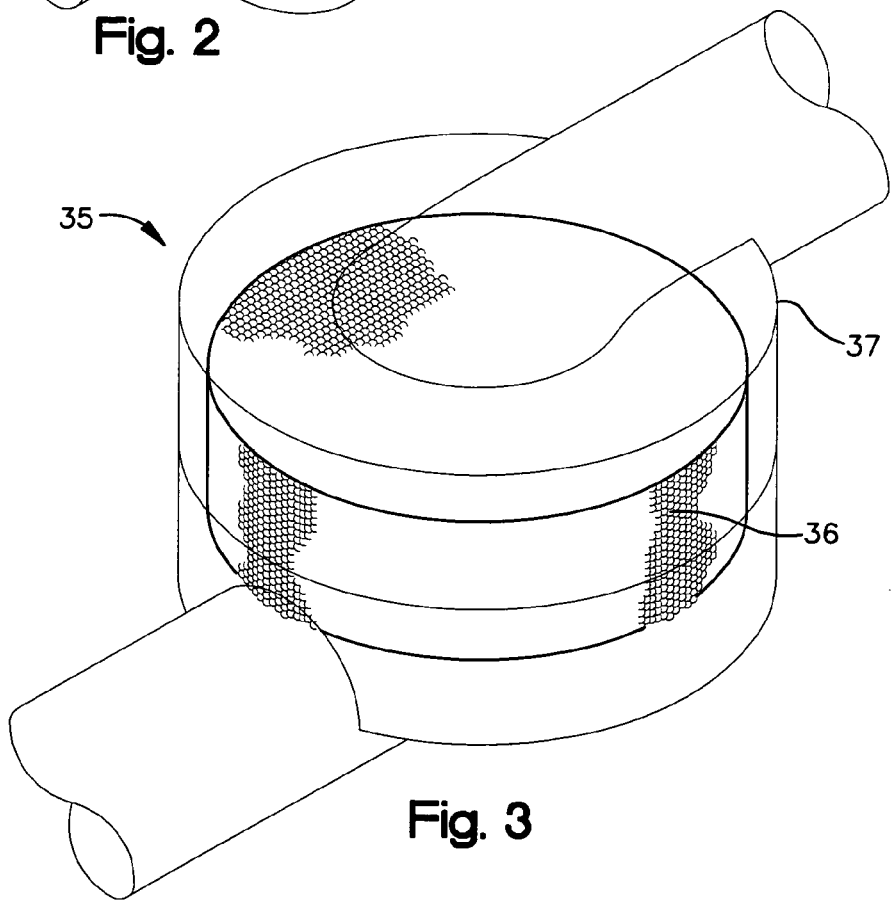
FIG. 3 is an illustration of an adsorber comprising a cohesive mass of adsorbant pellets.

FIG. 3 illustrates an adsorber 35 comprising a cohesive mass of pellets 36 in a housing 37. Loose pellets in a packed bed have a tendency to erode when mounted on a vehicle. The adsorber 35 mitigates this problem by forming the pellets into a cohesive mass, either by sintering the pellets together or mixing them with a binder. The individual pellets are preferably themselves made up of smaller particles held together by a binder or a sintering process. The spaces between the pellets correspond to the channels of the adsorber 30 and the voids in the pellets correspond to the voids in the walls of the adsorber 30. The comments regarding preferred composition and void sizes for the adsorber 30 apply to the adsorber 35. The adsorber 35 is provided in a pancake design. A pancake design gives a large cross-sectional area in the direction of flow and thereby reduces the pressure drop for a given bed volume.

Figure 4:
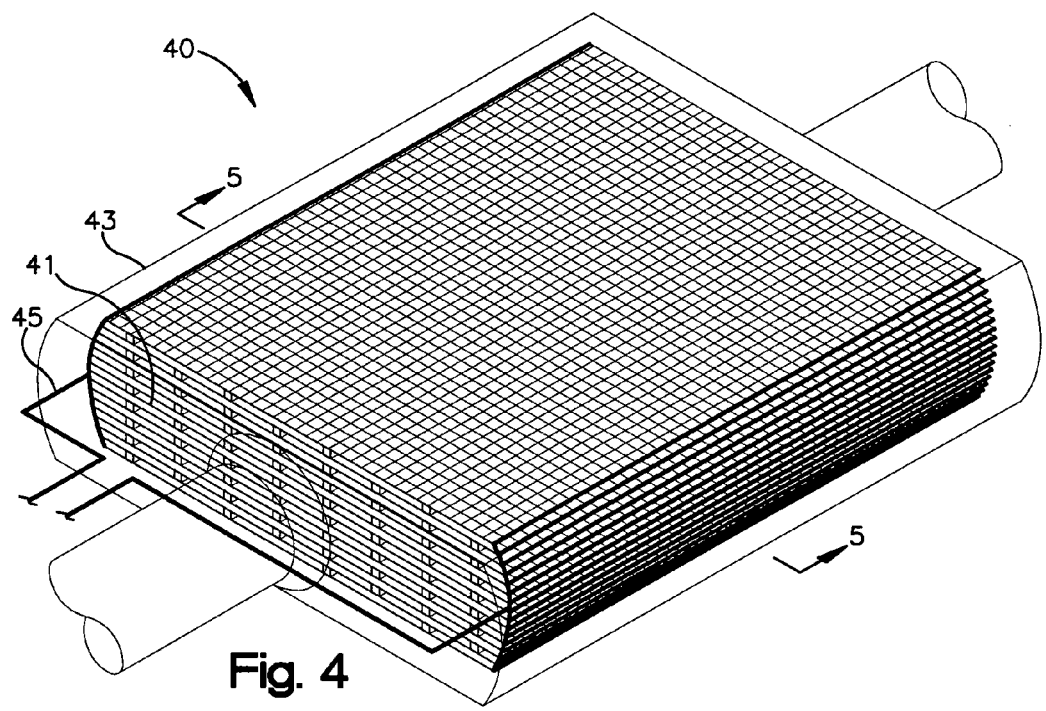
FIG. 4 is an illustration of an adsorber comprising a stack of coated screens.
Figure 5:
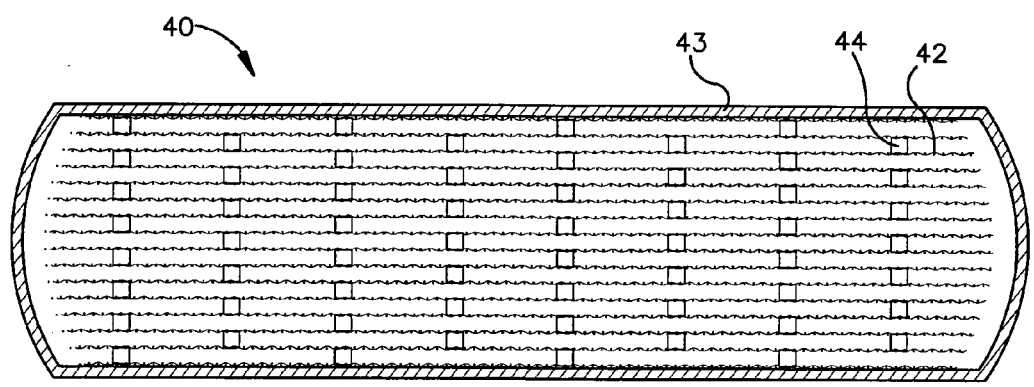
FIG. 5 is a cross-sectional view of the adsorber of FIG. 4.

FIGS. 4 and 5 illustrates a substrate 40 in the form of a stack 41 of coated metal screens 42 in a housing 43. The adsorbant, which can be a molecular sieve, forms a coating over the screens 42. Exhaust flows between the screens 42. The spacing between the screens is controlled by spacers 44. The openings in the screens 42 provide additional surface area for the adsorbent. Electrical leads 45 are connected to the screens along either side of the adsorbent bed. By connecting a power source to the electrical leads 45, the adsorber 40 can be heated.

Figure 6:
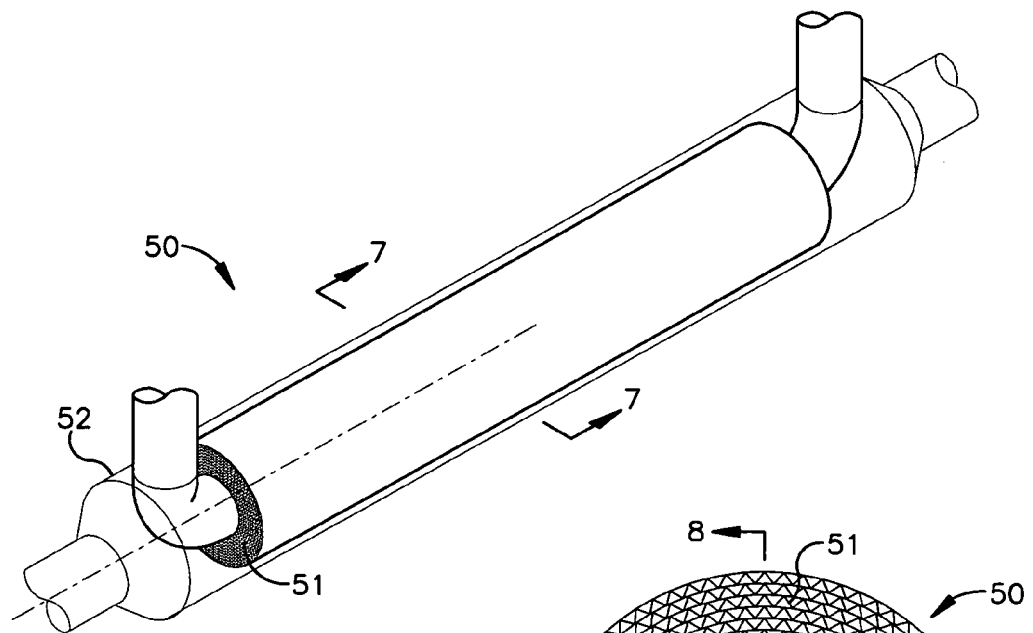
FIG. 6 is an illustration of an adsorber comprising an annular monolith adsorbant bed and a central channel for heat exchange.
Figure 7:
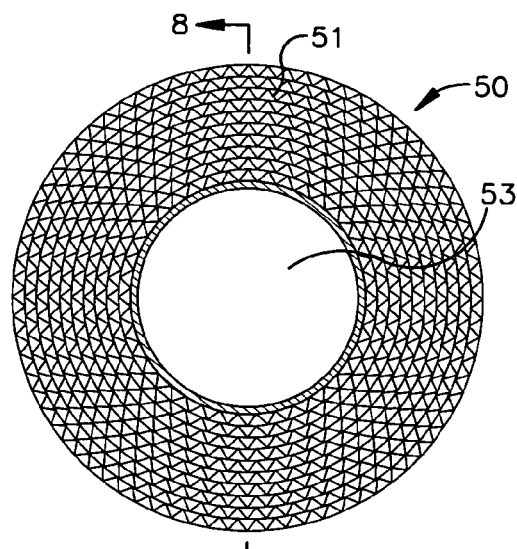
FIG. 7 is a cross-sectional view of the adsorber of FIG. 6.
Figure 8:
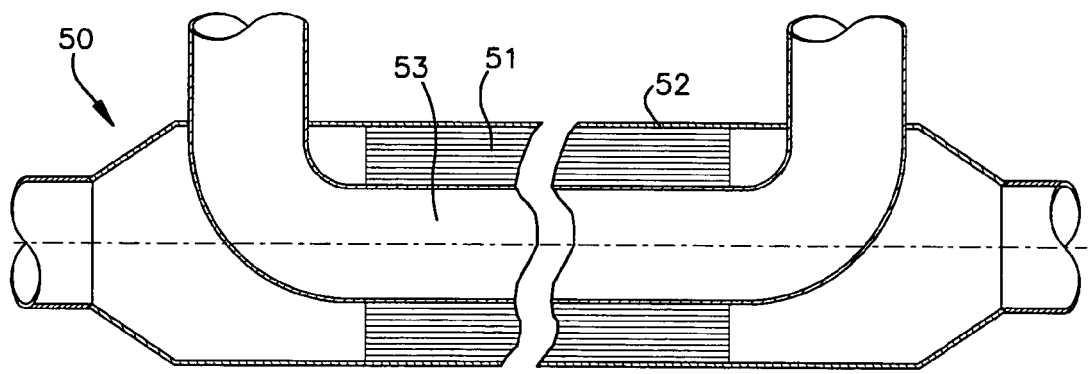
FIG. 8 is another cross-sectional view of the adsorber of FIG. 6.

FIGS. 6 to 8 illustrate an adsorber 50 comprising an annular monolith 51 enclosed in a housing 52 and surrounding a central channel 53. The central channel 53 is in fluid isolation from the monolith 51, but can be used to heat or cool the monolith. For example, the monolith can be heated by passing hot exhaust through the central channel 51 and cooled by driving ambient air through the central channel 51. The monolith itself can have any suitable structure. In one embodiment, the monolith is made up of metal foil coated with an adsorbant. A metal foil substrate can be used for electrical resistance heating.

Figure 9:
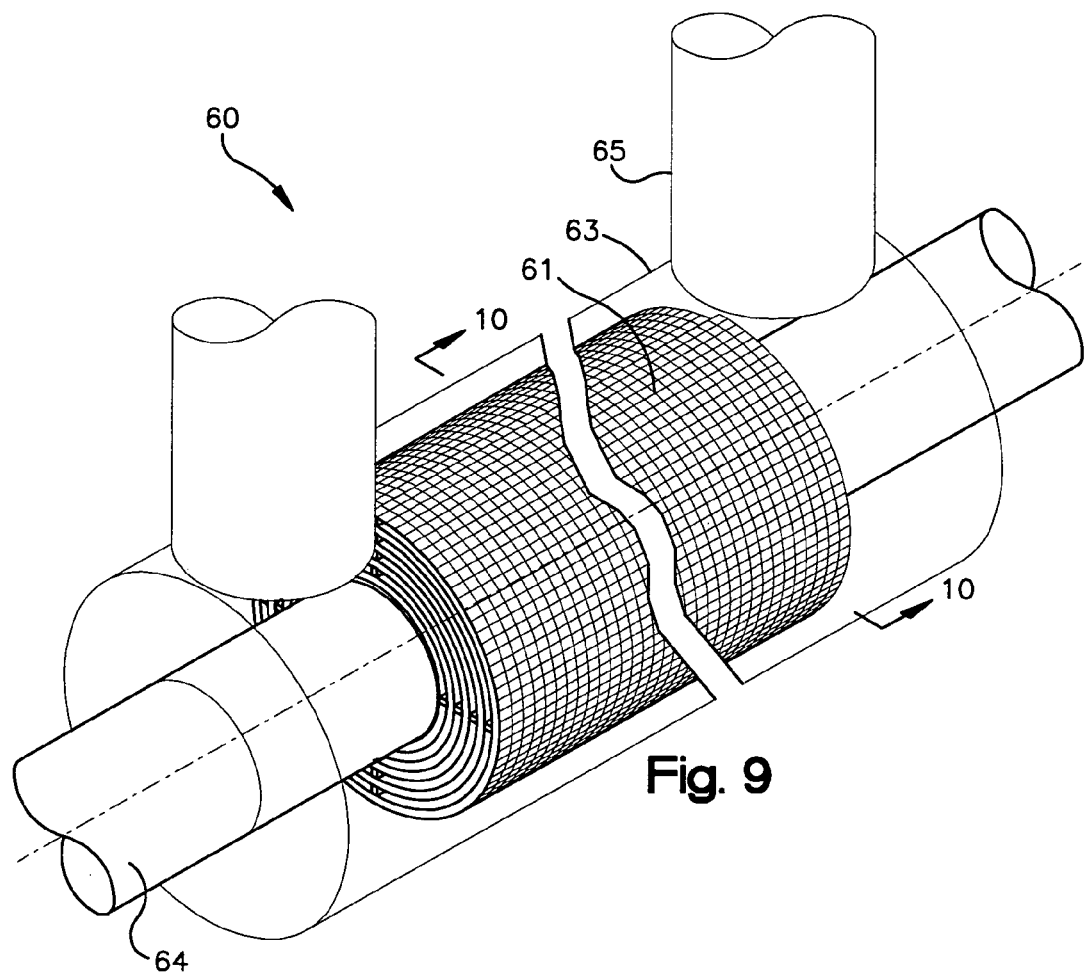
FIG. 9 is an illustration of an adsorber comprising a rolled, coated screen adsorbant bed surrounding a central channel for heat exchange.
Figure 10:
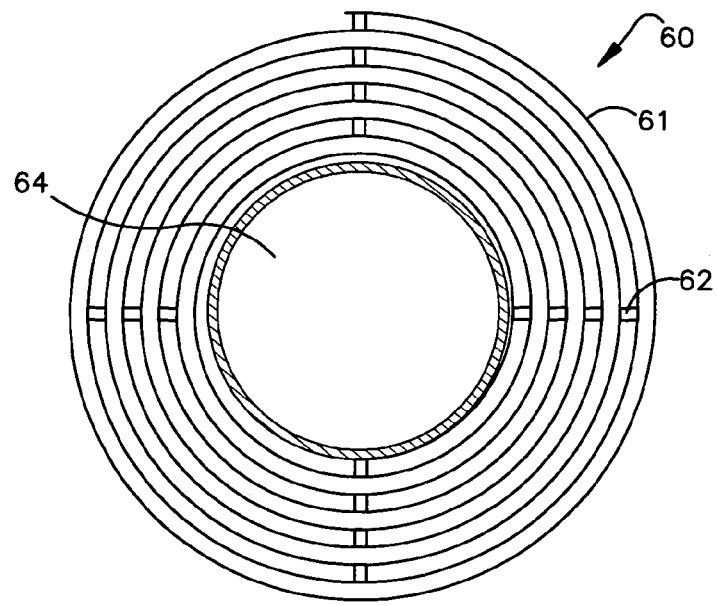
FIG. 10 is a cross-sectional view of the adsorber of FIG. 9.

FIGS. 9 and 10 illustrate an adsorber 60 that has a housing 63 and a central channel 64. The adsorbent bed 61 comprises a metal screen coated with adsorbant and rolled into a hollow cylinder to form roughly annular passages. The widths of the passages are controlled by spacers 62. The housing 63 is different from the housing 53 of the adsorber 50 in that the central passage vents out the ends rather than the sides. These housings can be interchanged.

Figure 11:
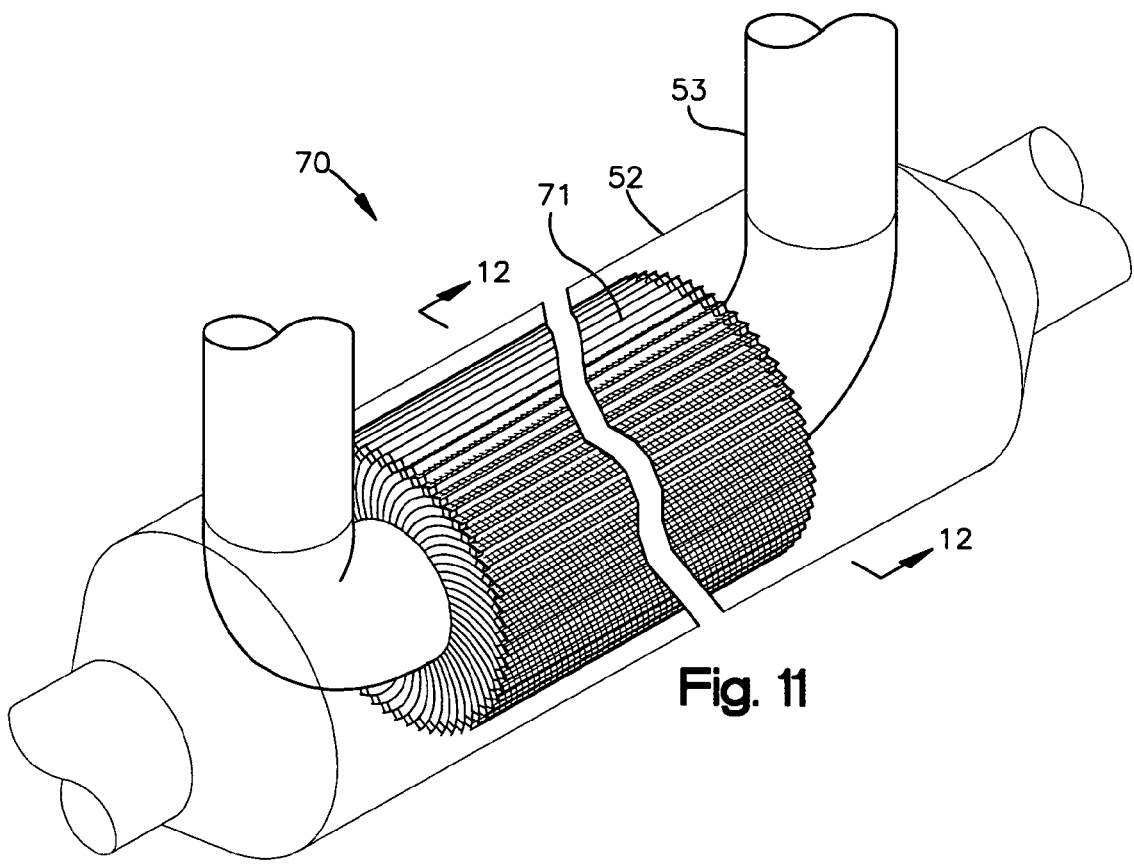
FIG. 11 is an illustration of an adsorber comprising coated screens radially arrayed around a central channel.
Figure 12:
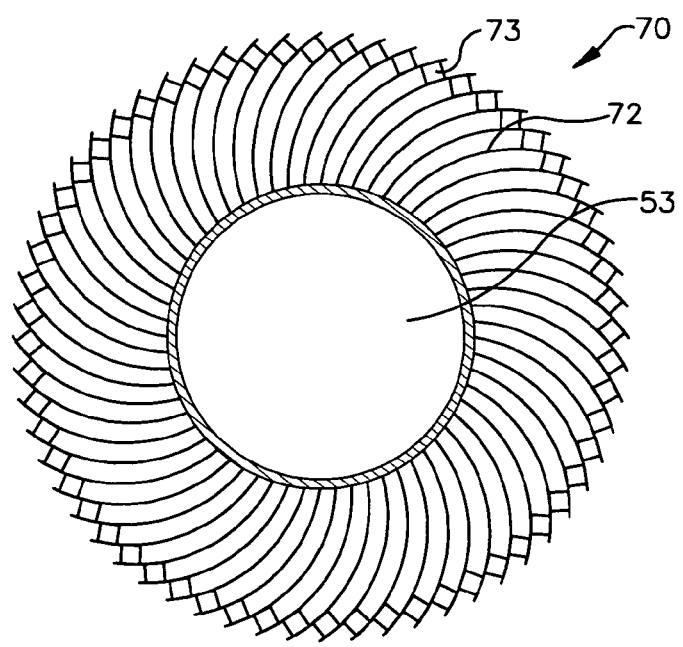
FIG. 12 is a cross-sectional view of the adsorber of FIG. 11.

FIGS. 11 and 12 illustrate adsorber 70 using the housing 52 and the central channel 53. The adsorber 70 comprises an adsorbant bed 71 made of metal screens 72 coated with adsorbant, attached edgewise, and arrayed radially about the central channel 53. Attaching the screens 72 edgewise to the central channel 53 may facilitate heat transfer between the adsorbant bed 71 and the central channel 53. Optionally, the central channel 53 includes heat-exchanger fins extending from the edges of the channel towards its interior. The screens 72 curve as they extend away from the central channel 53. The curvature limits or eliminates the tendency for the spacing between screens 72 to increase with distance from the central channel 53. The curvature also makes the adsorber 70 more compact and may further facilitate heat exchange with a fluid in the central channel 53. The spacing between screens is controlled with spacers 73.

Gas desorbed from the adsorbers 12 and 13 is combined with a reductant from reductant source 20 and reacted over the catalyst bed 22. Examples of suitable reductants include ammonia, synthesis gas (syn gas) products, hydrocarbons, and oxygenated hydrocarbons. Ammonia can be supplied in any suitable form, including for example urea, ammonium bicarbonate, or ammonium carbamate. Syn gas products include $H_2$ and CO. A group consisting of syn gas products includes $H_2$ and CO individually as well as mixtures of the two.

The catalyst bed 18 comprises a catalyst for a reaction that reduces NO to $N_2$. The reaction can be, for example, one or more of the following:

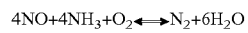

Catalysts for these reaction will also reduce other species of NOx.

Examples of catalysts for reactions with ammonia include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substitutes with metal ions such as cations of Cu, Co, Ag, Zn, or Pt, and activated carbon. Reaction can be obtained at relatively low temperatures, for example, temperatures in the range from about 230 to about 450° C.

Examples of catalysts for reactions with syn gas products, hydrocarbons, or oxygenated hydrocarbons include, without limitation, precious metals, such as Au, Ag, and Cu, group VIII metals, such as Pt, Pd, Ru, Ni, and Co, Cr, Mo, or K. The catalysts can be combined, for example Au with Pt, Pd, or Ru. The catalyst can be supported on a zeolite, such as Y zeolite, beta zeolite, mordenite, and ZSM-5, or a metal oxide, such as $Fe_2O_3$, $Al_2O_3$, ZnO, $ZrO_2$, $TiO_2$, $MnO_2$, and $CeO_2$. A preferred catlayst, giving high conversions at low temperatures, is Au on a metal oxide support, especially an $Fe_2O_3$ or $Al_2O_3$ support. High conversions can be obtained in the temperature range from about 150 to about 300° C.

Any of the substrates and structures described with reference to the NOx adsorbers 12 and 13 can be used for the catalyst bed 22 however, the design considerations are different and in any particular application different structures may be used. For example, a ceramic monolith with a wash coat containing the catalyst would be an appropriate choice for the catalyst bed 22, but would generally not be used for the adsorbers 12 and 13. In this regard, it should be noted that the adsorbers 12 and 13 are generally alternately heated and cooled and a small thermal mass is preferable to both conserve energy and reduce cycle time, whereas thermal mass is a much smaller concern for the catalyst bed 22.

The catalyst bed 22 can be heated by any of the mechanisms described with reference to the NOx adsorbers 12 and 13. The reduction reactions are endothermic and some heat must generally be supplied. The heat can be supplied by the feed gases. Alternatively, the catalyst bed 22 can be heated electrically or by heat exchange with a fluid.

The reductant source 20 can be any appropriate system for supplying the reductant. Hydrocarbons and oxygenated hydrocarbons can be stored in reservoirs and supplied as needed. Where ammonia is the reductant, the reductant source can be, for example, a reservoir of ammonia, ammonium carbomate, or urea. Ammonia can be generated on the vehicle by an ammonia plant that forms ammonia from $H_2$ and $N_2$ or from $H_2$ and NO. $N_2$ can be obtained from air and NO can be obtained from the adsorbers 12 and 13. $H_2$ can be produced by a reformer. Ammonia, whatever its source, can also be stored in adsorption beds, such as a molecular sieve adsorption beds, and desorbed as needed.

In one embodiment, the reductant is syn gas and the reductant source is a reformer together with purifiers and storage devices as appropriate. A reformer can convert fuel for the vehicle 10, such as diesel, into syn gas. A reformer can be a catalytic reformer or a plasma reformer. A reformer can use oxygen and/or steam. The reformer can be vehicle mounted. The reformer output is generally hot, and can be channeled through the adsorbant beds to facilitate desorption.

It is preferably to use feedback control to determine the rate at which the reductant is supplied. A control system senses the concentration of NOx, or some proxy therefore, downstream of the catalyst bed 22. A temperature sensor for the catalyst bed 22 is also preferred. In one example, the temperature of the catalyst bed is initially sensed. If it is within its operating range, the reductant feed is increased until a point is reached where the NOx concentration is at a target level or until a point where further increases in the reductant feed rate no longer reduce the NOx concentration. Alternatively, the reductant concentration may be detected downstream of the catalyst bed 22 and the reductant feed rate increased until break-through of the reductant is detected or until the concentration of the reductant reaches a targeted level. More precise control schemes can be formulated based on measuring concentrations for both the reductant and NOx.

The valves and associated conduits control the flow of exhaust and desorbed gases through adsorption and regeneration cycles. Conduits are inclusive of pipes and manifolds. The valves are generally actuated electronically under the control of a central processing unit. The central processing unit may serve other functions on the vehicle 10.

The cycling of the adsorbers 12 and 13 can be controlled in any suitable fashion. In one example, an adsorber is put into a regeneration cycle based on detecting a maximum allowed concentration of NOx in the exhaust downstream of the adsorber. In another example, the amount of NOx adsorbed is estimated based on information regarding vehicle operating conditions such as speed, engine temperature, and torque. From such data, a reasonable estimate of the amount of NOx emitted can be determined. Allowing a margin of error, the central processing unit can determine when it is time to regenerate an adsorber.

The provision of the catalyst bed 22 separate from the adsorbers 12 and 13 has advantages over systems in which reduction of NOx takes place in the adsorption bed. One advantage is that a single catalyst charge can serve a plurality of NOx adsorption beds. Another advantage is that the catalyst bed can be isolated from components of the exhaust that might deactivate or inhibit the catalyst. This permits the use of catalysts that are sensitive to water, oxygen, or sulfur, for example.

A further advantage of the invention is that the adsorbers can be operated at lower temperatures than adsorber-catalysts and other systems where the catalyst is in the main exhaust stream. In such systems, the adsorbers are kept warm to maintain catalyst activity. Lower temperature operation of the adsorbers is advantageous in that a greater loading of NOx for a given adsorber mass can typically be obtained. As a result, the adsorbers can be smaller and less expensive. In one embodiment, either the exhaust is cooled or the adsorber is cooled whereby even when the vehicle is operating at steady state under load, the temperature at which the adsorbers routinely operate to remove NOx is about 200° C. or less, in another embodiment, about 150° C. or less, in a further embodiment about 100° C. or less.

One embodiment of the invention contemplates that the adsorbers will be replaced periodically due to poisoning, especially sulfur poisoning. In this embodiment, it is significant that replacing an adsorber is less expensive than replacing an adsorber-catalyst. In one embodiment, the adsorber is designed for replacement after driving a distance that is no more than about 60,000 miles, in another embodiment it is designed for replacement after driving a distance that is no more than about 40,000 miles, in a further embodiment it is designed for replacement after driving a distance that is no more than about 20,000 miles.

For the vehicle 10, the temperature of the adsorbers 12 and 13 must be increased until the sum of the partial pressures of the adsorbates is sufficiently high to induce flow from the adsorbers 12 and 13 to the catalyst bed 22. This generally means the sum of the partial pressures must exceeds at least about one atmosphere, although a vacuum pump can be provided to draw the desorption product off the adsorbers 12 and 13. The desorption partial pressure can also be reduced by channeling the reductant and/or a small amount of exhaust gas through the adsorbers.

Figure 13:
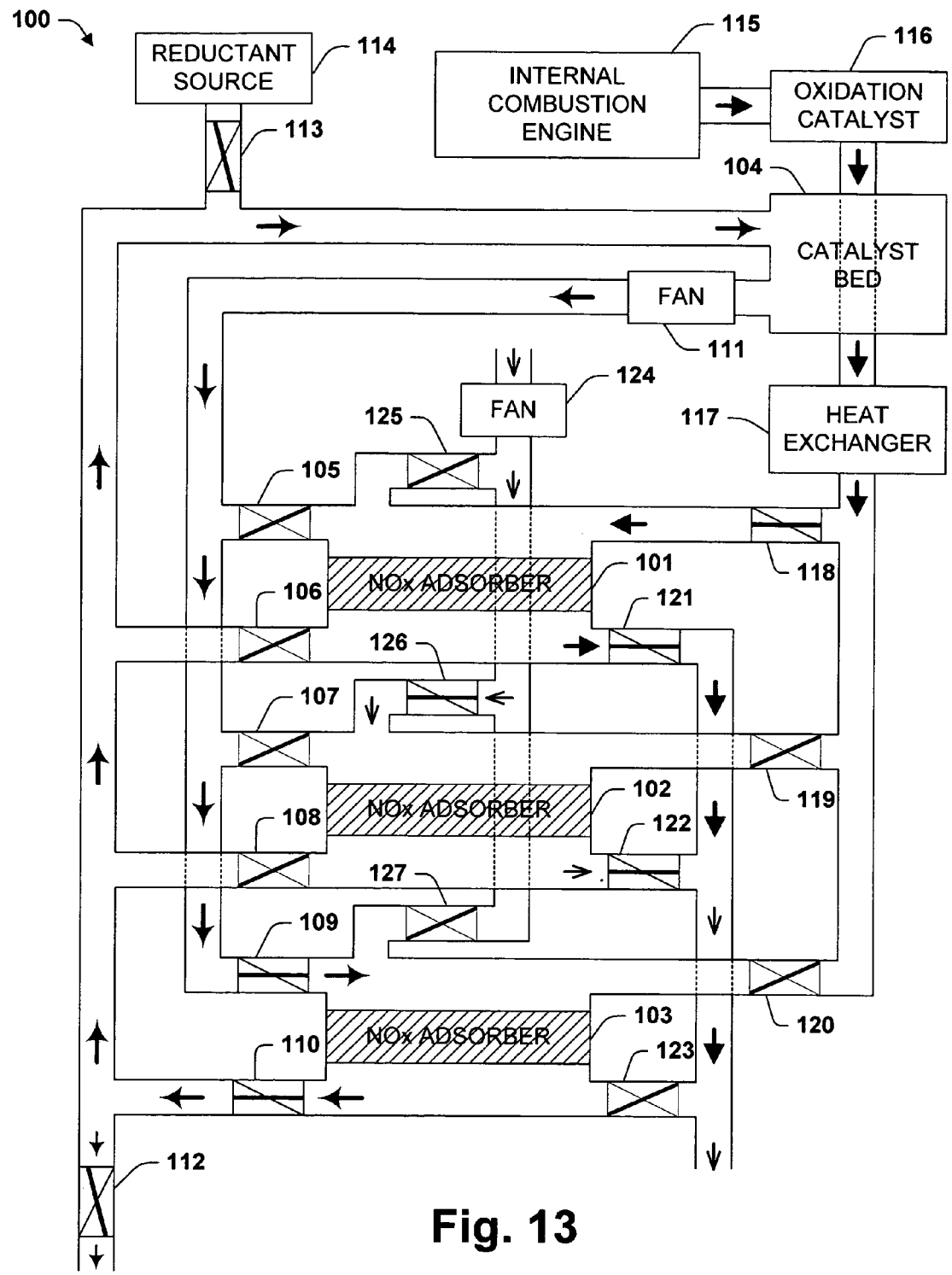
FIG. 13 is a schematic illustration of vehicle according to another aspect of the present invention.

FIG. 13 is a schematic illustration of a vehicle 100 in which desorption can occur at much lower partial pressures, permitting temperatures swings to be smaller and possibly eliminated altogether. The vehicle 100 includes adsorbers 101, 102, and 103. Each of these adsorbers can be selectively placed in a recirculating loop that includes a catalyst bed 104. Desorption will occur whenever the partial pressure in equilibrium with the adsorbant at its current loading level is lower than the partial pressure of the adsorbant in the recirculating gas.

Valves 105–110 control which of the adsorbers 101–103 is in a recirculating loop with the catalyst bed 104. In FIG. 13, valves 105–108 are closed and valves 100–110 are open, whereby only the adsorber 103 is in the recirculating loop. A fan 111 drives recirculation within the loop. Valve 112 is partially open and allows a fraction of the loop contents to be drawn off. Optionally, a vacuum pump can be installed downstream of valve 112 to enable the loop to operate below atmospheric pressure. Valve 113 controls the flow of a reductant from reductant source 114 into the loop.

The recirculating gas is optionally used to heat the adsorbers 101–103 to induce desorption. The gas can be heated anywhere in the recirculating stream. In the present example, the gas is heated by the catalyst bed 104, which is in turn heated by hot exhaust. The conduits in the recirculating loop can be insulated to conserve heat.

The exhaust is produced by internal combustion engine 115 and flows through oxidation catalyst 116 before entering heat exchange with the catalyst bed 104. The oxidation catalyst 116 is optional. An oxidation catalyst can serve to oxidize unburned hydrocarbons and CO and to convert NO to $NO_2$. $NO_2$ may be adsorbed more easily and may be reduced more easily, depending in part on the operation of the adsorbers 101–103 and the catalyst bed 104. An oxidation catalyst may also increase the temperature of the exhaust, making it a better source of heat. In another embodiment, the oxidation catalyst 116 is replaced by a catalyst-free ceramic monolith or other low pressure-drop device that gives thermal inertia to the exhaust stream. Such a device can smooth out fluctuations in the exhaust gas temperature and make the exhaust gas a more stable source of heat.

After heating the catalyst bed 104, the exhaust can be cooled in optional heat exchanger 117. The heat exchanger 117 can use any cool fluid, including, for example, engine coolant or ambient air. Valves 118–120, in cooperation with valves 121–123, selectively admit the optionally cooled exhaust to the adsorbers 101–103. In FIG. 13, valve 121 is open while valves 122 and 123 are closed, whereby the main exhaust flow only enters the adsorber 101.

If the exhaust gas is sufficiently cool, and the adsorbers 101–103 are already cool at the beginning of the adsorption cycle, the adsorbers 101–103 may not need any additional cooling during adsorption. In the vehicle 100, the adsorbers are cooled with ambient air following desorption. Fan 121 drives ambient air, which is selectively admitted to the adsorbers 101–103 by valves 122–124. In FIG. 13, valve 123 is open while valves 122 and 124 are closed, whereby ambient air is driven into adsorber 102 only. The valve 122 is also open, whereby the ambient air leaves the adsorber and combines with treated exhaust. In the vehicle 100, ambient air used for cooling flows through the same passages as exhaust. Optionally, the adsorbers 101–103 can be configured with separate passages for heat exchange. The design in FIG. 13, however, has the advantage that the adsorbers require no separate provision for heat exchange other than valving, permitting the adsorbers to have a very simple design.

The recirculating loops of FIG. 13 are also applicable to combined adsorber-catalyst systems. In addition to providing a simple means of heating and cooling the adsorber-catalysts, the recirculating system allows greater conversion of NOx to be achieved with a given amount of catalyst. In one embodiment, the ratio between the recirculating flow rate and the flow rate of release from the recirculating system is at least about 2:1, preferably it is at least about 5:1, and more preferably it is at least about 10:1.

The invention has been shown and described with respect to certain aspects, examples, and embodiments. While a particular feature of the invention may have been disclosed with respect to only one of several aspects, examples, or embodiments, the feature may be combined with one or more other features of the other aspects, examples, or embodiments as may be advantageous for any given or particular application.

The invention claimed is:

1. A vehicle, comprising:
an internal combustion engine;
an NOx adsorber configured to receive exhaust from the internal combustion engine;
a catalyst bed configured to receive gas desorbed from the NOx adsorber, the catalyst bed comprising a catalyst for a reaction between NO and a reductant selected from the group consisting of synthesis gas products, ammonia, hydrocarbons, and oxygenated hydrocarbons, wherein the reaction reduces NO to give $N_2$; and
valves and conduits configured to selectively channel exhaust from the internal combustion engine through the NOx adsorber and out of the vehicle while bypassing the catalyst bed and being further configured to selectively interrupt the flow of exhaust from the internal combustion engine to the NOx adsorber while channeling the gas desorbed from the NOx adsorber to the catalyst bed.

2. The vehicle of claim 1, wherein the vehicle comprises a plurality of NOx adsorbers and the valves and conduits are configured to selectively channel the exhaust to each of the NOx adsorbers and selectively channel gas desorbed from each of the NOx adsorbers to the catalyst bed.

3. The vehicle of claim 1, further comprising a reformer configured to reform a fuel suitable for the internal combustion engine into synthesis gas, wherein the vehicle is configure to provide the synthesis gas, or a product thereof, to the catalyst bed.

4. The vehicle of claim 1, wherein the catalyst comprises an effective amount of gold on a metal oxide support.

5. The vehicle of claim 1, wherein the NOx adsorber comprises an adsorption bed and a heating system selected from the group consisting of an electrical resistance heater and one or more heating fluid conduits in functional thermal communication but fluid isolation from the adsorption bed.

6. The vehicle of claim 1, wherein the NOx adsorber comprises a functional amount of a molecular sieve.

7. The vehicle of claim 1, further comprising an oxidation catalyst positioned to oxidize NO in the exhaust to $NO_2$ prior to the exhaust entering the NOx adsorber.

8. The vehicle of claim 1, further comprising valves and conduits configured to selectively channel ambient air through the NOx adsorber to cool the NOx adsorber.

9. The vehicle of claim 1, further comprising a heat exchanger configured to cool the exhaust to about 200° C. or less prior to entering the NOx adsorber.

10. The vehicle of claim 1, wherein the NOx adsorber is configured to maintain an operating temperature for adsorption at or below about 200° C. through fluid heat exchange.

11. The vehicle of claim 1, further comprising a vacuum pump configured to selectively draw a vacuum on the NOx adsorber.

12. The vehicle of claim 1, wherein the catalyst bed is configured for heating by the exhaust.

13. The vehicle of claim 1, further comprising valves and conduits configured to selectively recirculate gas between the NOx adsorber and the catalyst bed.

14. The vehicle of claim 13, further comprising a fan to drive the recirculation.

15. The vehicle of claim 13, further comprising a heating system configured to heat recirculating gas, the heating system having a structure selected from the group consisting of electrical resistance heaters and fluid heat exchangers, the heating system being located outside the NOx adsorber and functional to heat the NOx adsorber through the medium of the recirculating gas.

16. A vehicle, comprising:
an internal combustion engine producing exhaust during operation;
an NOx adsorber having channels for the exhaust and configured to receive the exhaust from the internal combustion engine;
valves and conduits being configured to channel exhaust from the internal combustion engine through the NOx adsorber and out of the vehicle during an adsorption cycle and being further configured to interrupt the flow of exhaust from the internal combustion engine to the NOx adsorber and, in conjunction with a fan, recirculate gas through the NOx adsorber during a regeneration cycle;
valves and conduits configured to selectively channel ambient air through the NOx adsorber during a cooling cycle.

17. A vehicle, comprising:
an internal combustion engine producing exhaust during operation;
an NOx adsorber having channels for the exhaust and configured to receive the exhaust from the internal combustion engine;
valves and conduits being configured to channel exhaust from the internal combustion engine through the NOx adsorber and out of the vehicle during an adsorption cycle and being further configured to interrupt the flow of exhaust from the internal combustion engine to the NOx adsorber and, in conjunction with a fan, recirculate gas through the NOx adsorber during a regeneration cycle;

a heating system configured to heat recirculating gas, the heating system having a structure selected from the group consisting of electrical resistance heaters and fluid heat exchangers, the heating system being located outside the NOx adsorber and functional to heat the NOx adsorber through the medium of the recirculating gas.

18. A method of reducing the amount of NOx in the exhaust of a vehicle, comprising:

passing the exhaust over a first NOx adsorption bed;

substantially isolating the bed from the exhaust;

heating the adsorption bed to desorb NOx;

combining the desorbed NOx with a reductant selected from the group consisting of synthesis gas products, ammonia, hydrocarbons, and oxygenated hydrocarbons to form a gas mixture;

passing the gas mixture over a catalyst to induce a reaction that reduces NOx to $N_2$ further comprising cooling the first NOx adsorption bed following desorption by flowing ambient air through the bed.

* * * * *